United States Patent
Deng et al.

(10) Patent No.: US 8,854,836 B2
(45) Date of Patent: Oct. 7, 2014

(54) TRANSISTOR OUTLINE CAN WITH IN-LINE ELECTRICAL COUPLINGS

(75) Inventors: Hongyu Deng, Saratoga, CA (US);
Yunpeng Song, San Ramon, CA (US);
Maziar Amirkiai, Sunnyvale, CA (US);
Martin Kalberer, Redwood City, CA (US)

(73) Assignee: Finisar Corporation, Sunnyvale, CA (US)

( * ) Notice: Subject to any disclaimer, the term of this patent is extended or adjusted under 35 U.S.C. 154(b) by 351 days.

(21) Appl. No.: 13/452,753

(22) Filed: Apr. 20, 2012

(65) Prior Publication Data

US 2013/0279139 A1   Oct. 24, 2013

(51) Int. Cl.
*H05K 7/00* (2006.01)

(52) U.S. Cl.
USPC .............................. 361/820; 361/807; 361/816

(58) Field of Classification Search
USPC ................. 361/799, 807, 809, 820, 816, 818; 439/55, 78, 79, 152, 159, 160, 507, 439/510; 438/106, 118, 122, 121, 124; 714/699, 724, 726, 730, 712; 370/216, 370/370

See application file for complete search history.

(56) References Cited

U.S. PATENT DOCUMENTS

| | | | | |
|---|---|---|---|---|
| 8,729,398 B2* | 5/2014 | Duppong | ...................... | 174/252 |
| 2008/0237835 A1* | 10/2008 | Togami et al. | ................ | 257/698 |
| 2011/0222567 A1* | 9/2011 | Scofet et al. | .................... | 372/36 |
| 2013/0155642 A1* | 6/2013 | McColloch | ................... | 361/820 |

* cited by examiner

*Primary Examiner* — Hung S Bui
(74) *Attorney, Agent, or Firm* — Maschoff Brennan

(57) ABSTRACT

An example embodiment includes a TO can including a header, an RF pin opening, an internal volume, an RF pin, a submount, and a flex circuit. The header defines the RF pin opening. The internal volume is defined by a TO can housing and an interior header surface. The RF pin extends through the RF pin opening such that a first surface connection is located in the internal volume and a second surface connection is located outside of the internal volume and extends past an exterior header surface. The submount is located in the internal volume and the submount includes a submount trace. The submount trace includes a pin connection portion in-line with the RF pin and electrically coupled to the first surface connection. The flex circuit includes a flex trace further including a flex trace connection in-line with the RF pin and electrically coupled to the second surface connection.

20 Claims, 7 Drawing Sheets

TRANSISTOR OUTLINE CAN WITH IN-LINE ELECTRICAL COUPLINGS

BACKGROUND

1. Field of the Invention

Embodiments relate generally to optical subassemblies ("OSAs"). More particularly, example embodiments relate to OSAs implementing a transistor outline ("TO") can with one or more radio frequency ("RF") pins.

2. Related Technology

Communication modules, such as electronic or optoelectronic transceivers or transponder modules, are increasingly used in electronic and optoelectronic communication. Communication modules communicate data signals with a printed circuit board ("PCB") of a host device. Additionally, communication modules communicate data signals outside the host device through optical communication networks such as the internet, local area networks ("LANs"), etc. In some embodiments, the communication modules, or components therein, transduce optical data signals and/or electrical data signals. For example, many communication modules include OSAs such as transmitter optical subassemblies (individually a "TOSA") and/or receiver optical subassemblies (individually a "ROSA") to convert between the electrical and optical domains.

Generally, a ROSA transforms an optical signal received from an optical fiber or other source to an electrical signal that is provided to the host device. A TOSA transforms an electrical signal received from the host device to an optical signal that is transmitted onto an optical fiber or other transmission medium. A photodiode or similar optical receiver contained by the ROSA transforms the optical signal to the electrical signal. A laser diode or similar optical transmitter contained within the TOSA is driven to transmit an optical signal representing the electrical signal received from the host device.

In some configurations, OSAs include a TO package such as a TO can. An example TO can may be a self-contained and often hermetically sealed canister with one or more optical/electrical components disposed within the canister. Specifically, one or more optical/electrical components such as the optical transmitter or the optical receiver may be disposed within TO cans. Additionally, the TO can may be configured to fit within a cavity defined in the OSA. The cavity of the OSA can secure the TO can to position the one or more optical/electrical components with respect to a port defined in the OSA. The port can be configured to receive the optical fiber that communicates with the optical communication network.

The TO can may include an optical component, such as a laser or other optical transmitter, or a photodiode or other optical receiver, disposed within the TO can. The TO can may additionally include circuitry or other electrical components. To enable communication with the one or more optical/electrical components within the TO can, a set of pins may penetrate a header of the TO can that electrically couples the optical/electrical components disposed within the canister to other components of the communication module and the host device. One or more of the pins included in the TO can may be radio frequency pins (singularly, an "RF pin").

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

Embodiments described herein relate generally to optical subassemblies ("OSAs"). More particularly, example embodiments relate to OSAs implementing a transistor outline ("TO") can with one or more radio frequency ("RF") pins.

An example embodiment includes a TO can. The TO can includes a header, an RF pin opening, an internal volume, an RF pin, a submount, and a flex circuit. The header has an interior header surface and an exterior header surface. The RF pin opening is defined by the header. The internal volume is defined by a TO can housing and the interior header surface. The RF pin extends through the RF pin opening such that a first surface connection is located in the internal volume and a second surface connection is located outside of the internal volume and extends past the exterior header surface. The a submount is located in the internal volume and the submount includes a submount trace. The submount trace includes a pin connection portion in-line with the RF pin and electrically coupled to the first surface connection Additionally, the flex circuit includes a flex trace that further includes a flex trace connection that is in-line with the RF pin and electrically coupled to the second surface connection.

Another embodiment includes an RF system configured to communicate RF signals between an active component of a TO can and a printed circuit board ("PCB"). The RF system includes an exterior electrical trace, an interior electrical trace, and an RF pin. The exterior electrical trace is configured to be electrically coupled to the PCB and includes an exterior connector. The interior electrical trace is configured to be electrically coupled to the active component and includes an interior connector. Additionally, the RF pin includes a first surface connection electrically coupled to the interior connector, a second surface connection electrically coupled to the exterior connector, and a penetration length between the first surface connection and the second surface connection that extends from an exterior of the TO can to an interior of the TO can. When assembled, some portion of the exterior electrical trace and the RF pin are collinear and some portion of the interior electrical trace and the RF pin are collinear.

Another embodiment includes an OSA. The OSA includes a barrel, a TO can, and a flex circuit. The barrel defines a TO cavity and a port. The TO cavity is sized to receive a TO can and the port is configured to receive an optical fiber. The TO can includes a header, an RF pin, a submount trace, and an active component. The header has an interior header surface and an exterior header surface. The RF pin extends through the header such that a first surface connection is located in an internal volume of the TO can and a second surface connection is located outside the TO can. The submount trace includes a pin connection portion that is in-line with the RF pin and electrically coupled to the first surface connection. The active component is electrically coupled to the submount trace. Additionally, the flex circuit includes a flex trace. The flex trace includes a flex trace connection that is in-line with the RF pin. The flex trace connection is electrically coupled to the second surface connection.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description, which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Embodiments described herein relate generally to optical subassemblies ("OSAs"). More particularly, example embodiments relate to OSAs implementing a transistor outline ("TO") can with one or more radio frequency ("RF") pins.

An example embodiment includes a TO can with an RF pin. The RF pin extends through an RF pin opening defined in a header such that a first surface connection is located in an internal volume and a second surface connection is located outside of the internal volume. The internal volume is defined within the TO can. The TO can also includes a submount located in the internal volume. The submount includes a submount trace that further includes a pin connection portion that is in-line with the RF pin and electrically coupled to the first surface connection. Additionally, a flex circuit includes a flex trace that further includes a flex trace connection that is in-line with the RF pin and electrically coupled to the second surface connection.

Embodiments of the TO can described herein may be implemented in and/or with an optoelectronic device. As used herein, the term "optoelectronic device" includes a device having both optical and electrical components. Examples of optoelectronic devices include, but are not limited to, transponders, transceivers, transmitters, and/or receivers. While the invention will be discussed in the context of a transceiver or an optoelectronic device, those of skill in the art will recognize that the principles of the present invention may be implemented in other optoelectronic devices having the functionality described below.

Figure 1A:
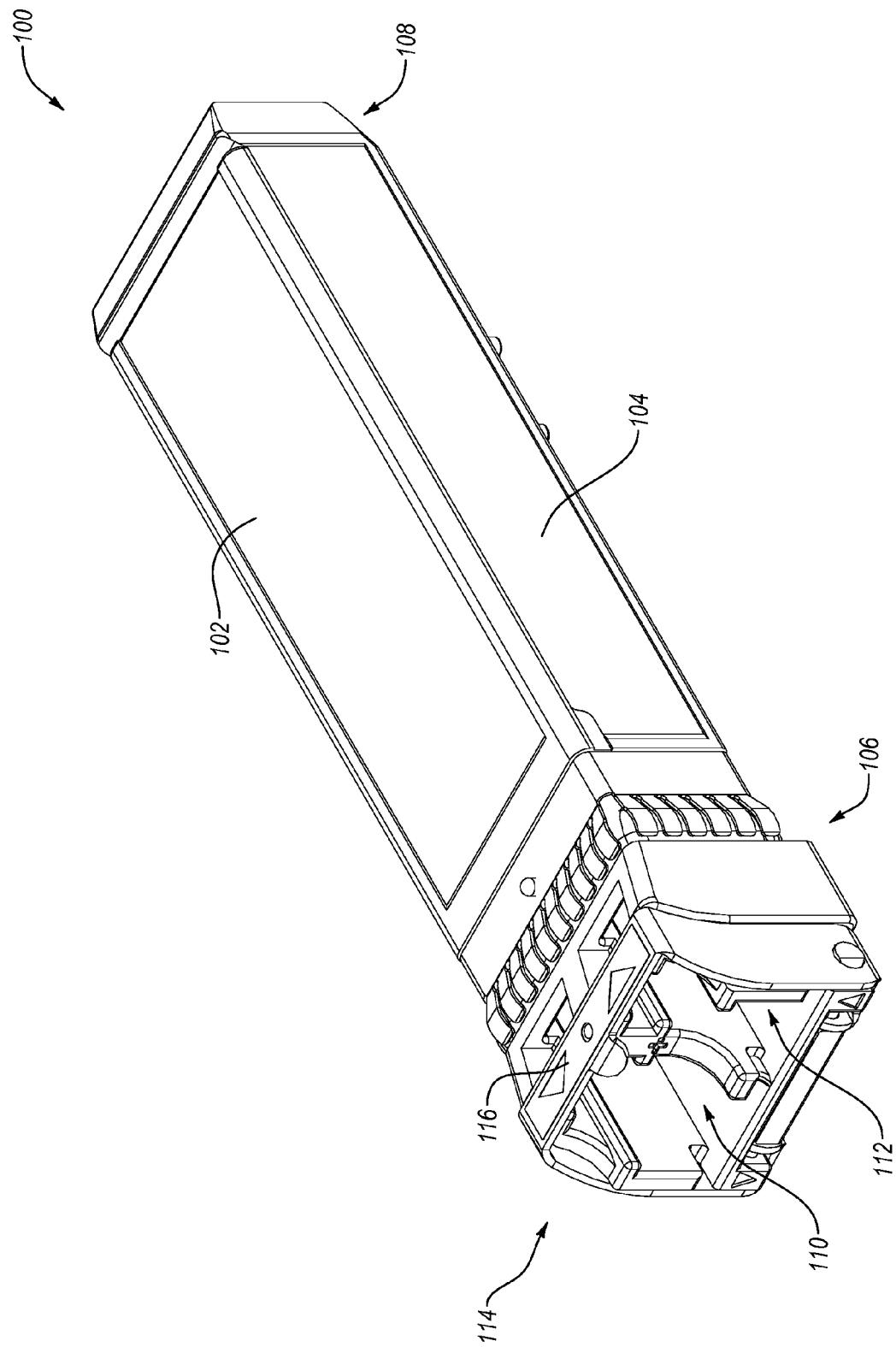
FIG. 1A is a perspective view of an example transceiver in which some embodiments described herein may be implemented.

FIG. 1A illustrates a perspective view of an example transceiver module generally designated as transceiver 100 in which some embodiments described herein may be implemented. The transceiver 100 may be an SFP+ optical transceiver, although this is not required in all embodiments. While described in some detail herein, the transceiver 100 is discussed by way of illustration only, and not by way of restricting the scope of the invention. For example, although the transceiver 100 may be an SFP+ optical transceiver in some embodiments, the principles of the invention can be implemented in optoelectronic devices of any form factor such as CFP, QSFP, XFP, SFP, SFP+, SFF, XENPAK, and XPAK, without restriction. Alternatively or additionally, the transceiver 100 can be suitable for optical signal transmission and reception at a variety of per-second data rates, including but not limited to, 10 gigabit (Gbit), 20 Gbit, or higher data rate fiber optic links. Some embodiments described herein may result in relatively higher bandwidths up to 40 gigahertz (GHz) or higher, for example. Furthermore, optoelectronic devices of other types and configurations, or having components that differ in some respects from those shown and described herein, can also benefit from the principles disclosed herein.

As shown in FIG. 1A, the transceiver 100 includes a body composed of a top shell 102 and a bottom shell 104. The body of the transceiver 100, including top shell 102 and bottom shell 104, can be composed of metal, for instance. The bottom shell 104 defines a front end 106 and a back end 108 of the transceiver 100. Included on the front end 106 of the transceiver 100 bottom shell 104 are two optical ports 110 and 112 configured to receive connectors of an optical fiber (not shown). The two optical ports 110 and 112 include an output port 110 and an input port 112. The optical ports 110 and 112 define an interface portion 114 that is generally included on the front end 106 of the transceiver 100. The interface portion 114 can include structures to operably connect the transceiver 100 to optical fibers or optical fiber connectors such as LC connectors.

Generally, a host device (not shown) may be any computing system capable of communicating with the transceiver 100. The host device may include a cage in which the transceiver 100 is inserted. In addition, disposed on the transceiver 100 front end 106 is a bail latch assembly 116 that enables the transceiver 100 to be removably secured in the host device.

Figure 1B:
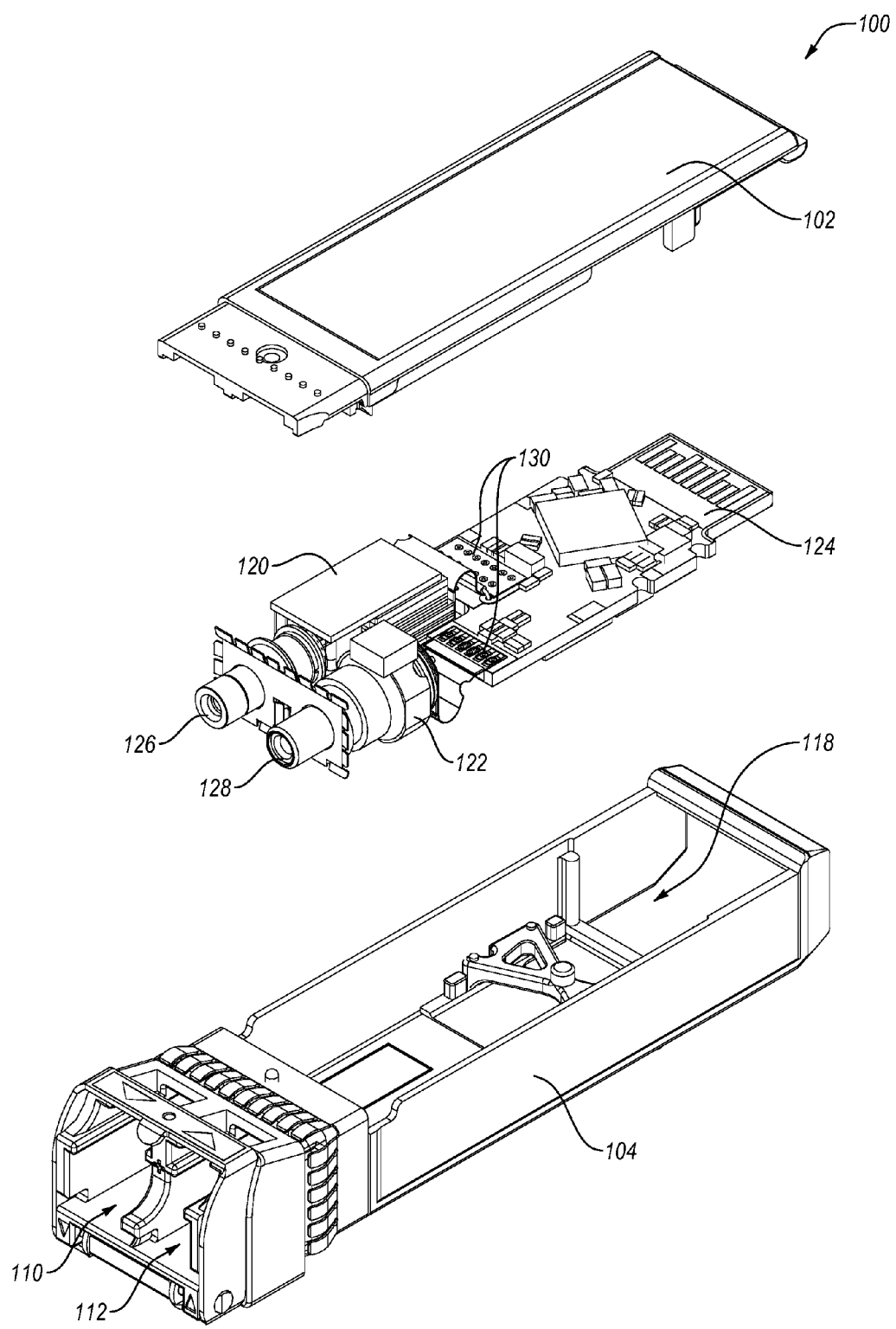
FIG. 1B is a partially exploded perspective view of the transceiver of FIG. 1A.

FIG. 1B illustrates a partially exploded perspective view of the transceiver 100 of FIG. 1A. In FIG. 1B, the top shell 102 has been removed from the bottom shell 104 exposing a cavity 118 defined by the bottom shell 104. In the cavity 118, a TOSA 120, a ROSA 122, a printed circuit board ("PCB") 124, and PCB connectors 130 are included as internal components of the transceiver 100.

The TOSA 120 in the transducer 100 is a box type TOSA which does not include a transistor outline ("TO") can. Nevertheless, the principles described with reference to the TOSA 120 of FIG. 1B relate to embodiments disclosed herein. Each of the TOSA 120 and the ROSA 122 includes a port 126 and 128, respectively, that extends into a respective one of the optical ports 110 and 112 so as to be positioned to mate with an optical fiber or a connector portion (not shown) of the optical fiber when received within optical ports 110 and 112. The TOSA 120 and the ROSA 122 can be electrically coupled to the PCB 124 via the PCB electrical connectors 130. The PCB electrical connectors 130 may include a lead frame connector or equivalent electrical contact(s) that allow the transmission of electrical signals from the PCB 124 to the TOSA 120 and/or the ROSA 122.

During operation, the transceiver 100 can receive a data-carrying electrical signal from the host device for transmission on the optical fiber. The electrical signal can be provided to an optical transmitter, such as a laser (not shown) disposed within the TOSA 120, which converts the electrical signal into a data-carrying optical signal for transmission on the optical fiber and transmission via an optical communication network, for instance. The optical transmitter can include an edge-emitting laser diode, a Fabry-Perot ("FP") laser, a vertical cavity surface emitting laser ("VCSEL"), a distributed feedback ("DFB") laser, or other suitable light source. Accordingly, the TOSA 120 can serve or include components that serve as an electro-optic transducer.

In addition, the transceiver 100 can receive a data-carrying optical signal from an optical fiber via the ROSA 122. The ROSA 122 can include an optical receiver, such as a photodiode or other suitable receiver, which transforms the received optical signal into a data-carrying electrical signal. Accordingly, the ROSA 122 can include components that serve as an opto-electric transducer. The resulting electrical signal can then be provided to the host device to which the transceiver 100 is coupled.

Figure 2A:
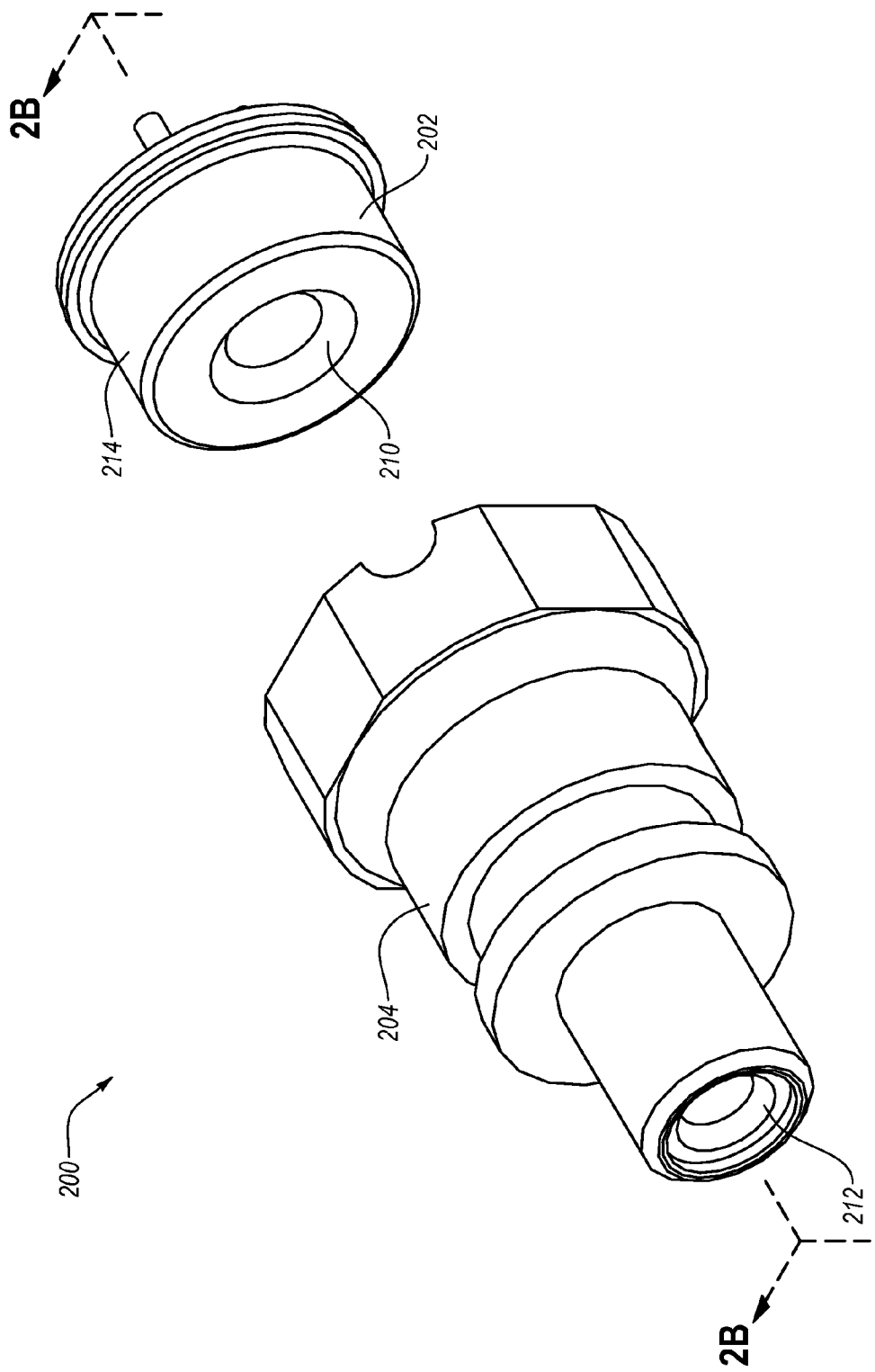
FIGS. 2A and 2B illustrate an example optical subassembly ("OSA") that may be included in the transceiver of FIGS. 1A and 1B.
Figure 2B:
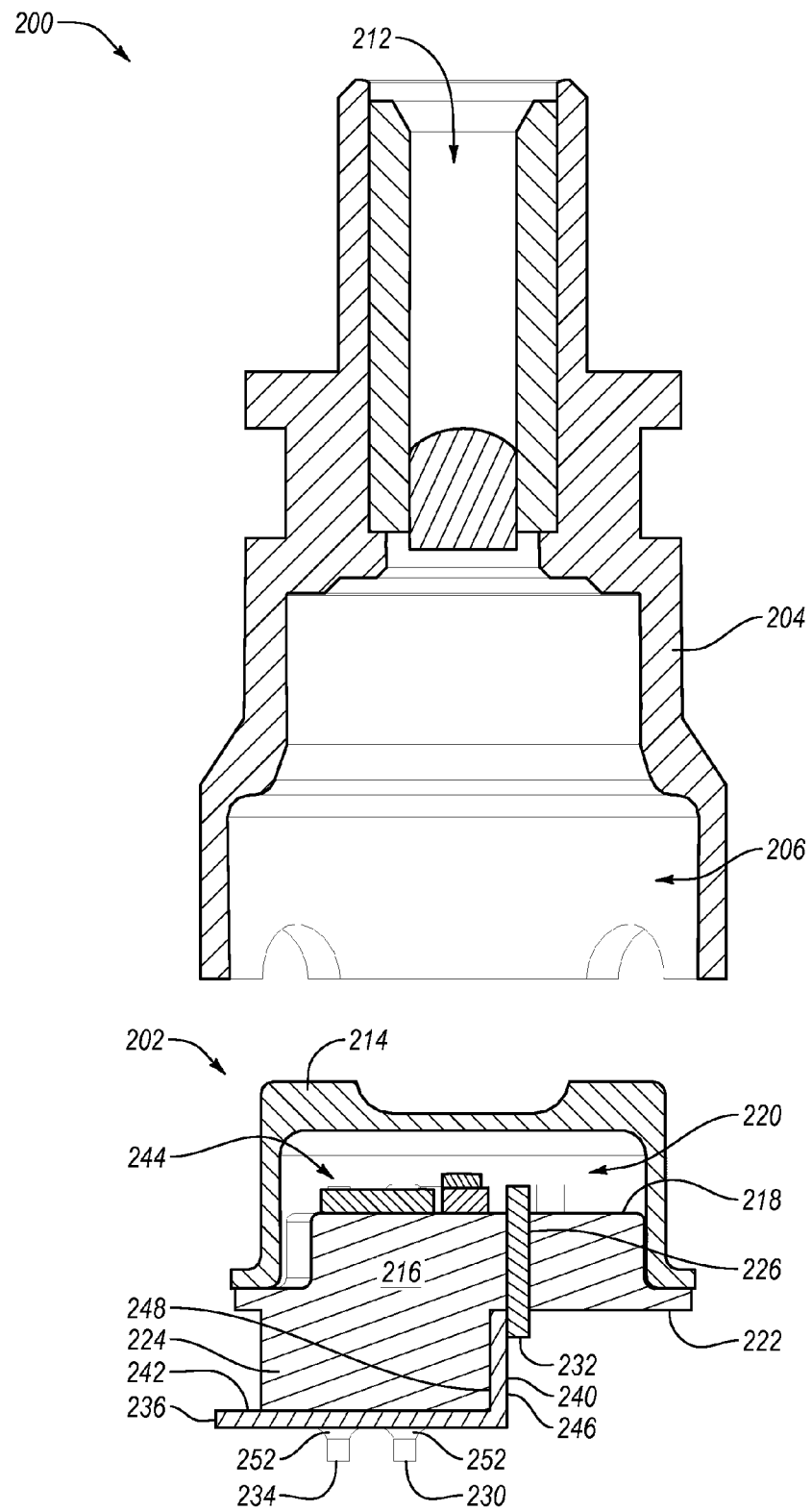

FIGS. 2A and 2B illustrate an example optical subassembly ("OSA") 200 that may be included in the transceiver 100 of FIGS. 1A and 1B. Specifically, FIG. 2A is a partially exploded perspective view of the OSA 200 and FIG. 2B is a partially exploded cross-sectional view of the OSA 200. In some embodiments, one or both of the TOSA 120 or ROSA 122 of FIG. 1B may be implemented as generally described with respect to the OSA 200 of FIGS. 2A-2B.

The OSA 200 depicted in FIGS. 2A and 2B is a ROSA including a TO can 202, but this depiction is not meant to limit the scope of the invention and instead is included to provide a specific example-operating environment. The principles described herein are applicable to all OSAs, including both ROSAs and/or TOSAs.

With combined reference to FIGS. 2A and 2B, the OSA 200 may include a barrel 204. The barrel 204 includes a hollow shell defining a port 212 and a TO cavity 206 (FIG. 2B). The port 212 may be configured to receive an optical fiber (not shown), which may provide an interface between the OSA 200 and an optical communication network (not shown). The port 212 can support and/or secure the optical fiber, enabling communication of optical signals through the optical fiber. For example, in embodiment in which the OSA 200 is a TOSA, optical data-carrying signals may be generated in the OSA 200 and then transmitted through the optical fiber. Alternatively, in embodiments in which the OSA 200 is a ROSA, optical data-carrying signals may be received from the optical fiber. In some embodiments, the barrel 202 and the port 212 can further include various components such as a split sleeve, a split sleeve receptacle, a fiber stub, and inner rings, for instance. These components generally relate to supporting and/or securing the optical fiber for the function(s) described above.

The TO can 202 may be inserted into the TO cavity 206. As best illustrated in FIG. 2B, the TO cavity 206 may be sized to receive the TO can 202 and/or provide a tight fit for the TO can 202. The TO cavity 206 may secure and/or align the TO can 202 such that one or more optical/electrical components 244 disposed within the TO can 202 may communicate optical data signals using the optical fiber secured in the port 212. For example, in embodiments in which the OSA 200 is a TOSA, the optical/electrical components 244 may include an optical transmitter. The optical transmitter may generate an optical data-carrying signal that may be transmitted through the barrel 204, and then onto the optical fiber secured in the port 212.

Referring to FIG. 2A, the TO can 202 may be generally cylindrical and may include a TO can housing 214. The TO can housing 214 may secure a lens (not shown) that allows data signals to enter and exit the TO can 202. The TO can housing 214 may provide a circumferential boundary 210 that may supports the lens.

Referring to FIG. 2B, the TO can housing 214 may be hermetically sealed to a header 216. Hermetically sealing the TO can housing 214 to the header 216 may prevent introduction of ambient conditions into an internal volume 220. The internal volume 220 can be defined by TO can housing 214 and an interior header surface 218.

Generally, the optical/electrical components 244 may be included within the internal volume 220. The optical/electrical components 244 that can be disposed within the internal volume 220 can include, but are not limited to, an active optical component, such as an optical receiver or an optical transmitter; submounts including submount traces; and/or components that modify, monitor, amplify, and/or attenuate optical and/or electrical signals to conform to operating capabilities of a transceiver or other system implementing the OSA 200. The optical/electrical components 244 disposed within the internal volume 220 generally act as an optical-electrical interface that may convert signals between the electrical and optical domains. The optical/electrical components 244 may be mounted or otherwise secured to the interior header surface 218. Again, the OSA 200 depicted in FIGS. 2A and 2B is a ROSA; the TO can housing 214 and the internal volume 220 may vary in embodiments in which the OSA 200 is configured as a TOSA or another OSA.

The OSA 200 can include the header 216 that may be secured to the TO can housing 214. Electrically, the header 216 may be grounded and/or act as an electrical ground for the OSA 200. Accordingly, the header 216 may be composed of rolled steel or another conductive material.

The header 216 may include the interior header surface 218 and an exterior header surface 222. As stated above, the interior header surface 218 may be a boundary of the internal volume 220. The exterior header surface 222 generally refers to the surfaces of the header 216 that are exposed to ambient conditions. The exterior header surface 222 may form an external boundary of the TO can 202 and may include various sub-surfaces dependent on the configuration and/or manner in which a support block 224 is affixed to the exterior header surface 222. Some details of the support block 224 are presented below.

As best illustrated in FIG. 2B, the header 216 may define one or more pin openings 226. For example, the header 216 may define one or more radio frequency pin openings ("RF pin openings") and/or one or more direct current pin openings ("DC pin openings") (not shown) (collectively, "pin openings 226"). The pin openings 226 may enable a pin 230 and 232 to extend through the header 216. For example, a direct current pin ("DC pin") 230 may extend through the DC pin opening defined by the header 216, and/or a radio frequency pin ("RF pin") 232 may extend through the RF opening defined by the header 216.

In the depicted embodiment, there are three pins 230, 232, and 234; however, an OSA 200 can include any number of pins 230, 232, and 234. A first type of pin is the DC pin 230; a second type of pin is the RF pin 232; and a third type of pin is a ground pin 234. The pins 230, 232, and 234 generally extend axially from the header 216. Additionally, the pins 230, 232, and 234 may be substantially parallel. However, in alternative embodiments, the pins 230, 232, and 234 may diverge or converge as the pins 230, 232, and 234 extend from header 216.

The DC pin 230 and the RF pin 232 may extend through the header 216, but the ground pin 234 may not. Instead, in this and other embodiments, the ground pin 234 may be welded, fastened, equivalently secured to the header 216, or formed as one body with the header 216.

Each of the DC pin 230 and the RF pin 232 includes some portion that extends above the interior header surface 218 that electrically couples to one or more optical/electrical components 244 within the internal volume 220. In some embodiments, the RF pin 232 and/or the DC pin 230 may be electrically coupled to the one or more optical/electrical components 244 via wire bonds and/or through electrical traces on submounts, for instance. For example, the RF pin 232 may couple to a pin connection portion of a submount trace on a submount. On the other end of the submount trace there may be a wire bond that couples the submount trace to an active component included in the internal volume 220.

Additionally, the pins 230, 232, and 234 may be electrically coupled to a flex circuit 236 to electrically couple the OSA 200 to a PCB of a transceiver. Generally, the flex circuit 236 can include a flexible printed circuit that generally includes conductive elements configured into electrical traces (referred to herein as "flex traces") and flexible substrates. The flexible substrates may be composed of materials such as, but not limited to, polyimide, polyester, polyether ether ketone, and/or polyethylene terephthalate ("PET"). In some embodiments, the conductive elements are formed on and/or between the flexible substrates. For example, the flexible circuit 236 can include a copper strip laminated with layers of PET. Alternatively or additionally, the flexible circuit 236 can include a silver circuit that is screen printed on a polyester substrate. Alternatively or additionally, the flexible circuit 236 may be manufactured similarly to printed circuit boards. These manufacturing methods may include laminating together dielectric layers with epoxy resin, coating the dielectric layers with a conductive layer such as, but not limited to, copper foil, then creating a circuit by removing or chemically etching an unwanted portion of the conductive layer from the dielectric layers.

The pins 230, 232, and 234 may be electrically coupled to the flex circuit 236 in at least two ways in some embodiments. The first way, depicted for the ground pin 234 and the DC pin 230, may include a connection hole defined by the flexible circuit 236. The ground pin 234 and the DC pin 230 may extend through the connection hole and may be electrically coupled at the connection hole to the flex circuit 236. In some embodiments, the ground pin 234 and the DC pin 230 may include a flange 252. The flange 252 may include a diameter larger than the connection hole to aid in securing ground pin 234 and the DC pin 230 to a flex trace surrounding the connection hole. Additionally, the flange 252 may provide a larger area for the electrical coupling between the ground pin 234 and the DC pin 230 and the flex circuit 236. For example, the flex circuit 236 may define a DC connection hole (not shown) through which the DC pin 230 extends and at which the DC pin 230 is electrically coupled to the flex circuit 236.

An alternative way in which the flex circuit 236 is electrically coupled to one of the pins 230, 232, and 234 may include an in-line connection. In this and other embodiments, the in-line connection is depicted for the RF pin 232. The in-line connection may occur for example when the flex circuit 236 is bent. For example in FIG. 2B, the flex circuit 236 is bent creating a first flex portion 240 that is parallel or substantially parallel to the RF pin 232, and a second flex portion 242 perpendicular or substantially perpendicular to the RF pin 232. The first flex portion 240 may include a flex trace located on a first flex circuit surface 246. The flex trace may include a flex trace connection that, after bending the flex circuit 236 is adjacent to the RF pin 232. The RF pin 232 may be electrically coupled to the flex trace connection of the flex circuit 236.

As mentioned above, the header 216 may include the support block 224. The support block 224 may provide mechanical support for the flex circuit 236 when making the in-line connection between the RF pin 232 and the flex circuit 236. For example, in embodiments in which the flex trace is located on the first flex circuit surface 246, the support block 224 may abut a second flex circuit surface 248. The support block 224 may take any variety of shapes and may be composed of any variety of materials. Additionally, in some embodiments, the support block 224 and the header 216 may be integrated in a single component, while in other embodiments, the support block 224 and the header 216 may be implemented as discrete components with the header 216 affixed to the exterior header surface 222 of the header 216.

In some embodiments, the pin openings 226 may extend through the support block 224. Additionally or alternatively, the flex circuit 236 may generally conform to the support block 224. For example in FIG. 2B, the second flex portion 240 follows the support block 224 and the DC pin 230 extends through a DC pin opening that may be defined by the header 216 and the support block 224 and may electrically couple to the second flex portion 240.

Electrical impedance may be introduced through the electrical couplings between the pins 230, 232, and 234 and the flex circuit 236 and/or the one or more optical/electrical components 244. In some embodiments, the OSA 200 may benefit from reducing impedance between one or more of the pins 230, 232, and 234, one or more optical/electrical components 244 and/or the flex circuit 236. By coupling the RF pin 232 using the in-line connection, the impedance between the flex circuit 236 and the RF pin 232 may be reduced compared to configurations in which RF pins are coupled to flex circuits 236 using other than in-line connections. Example benefits may include an increase in the bandwidth of the OSA 200. For example, some OSAs 200 with in-line connections may have a bandwidth of about 40 GHz.

Figure 3A:
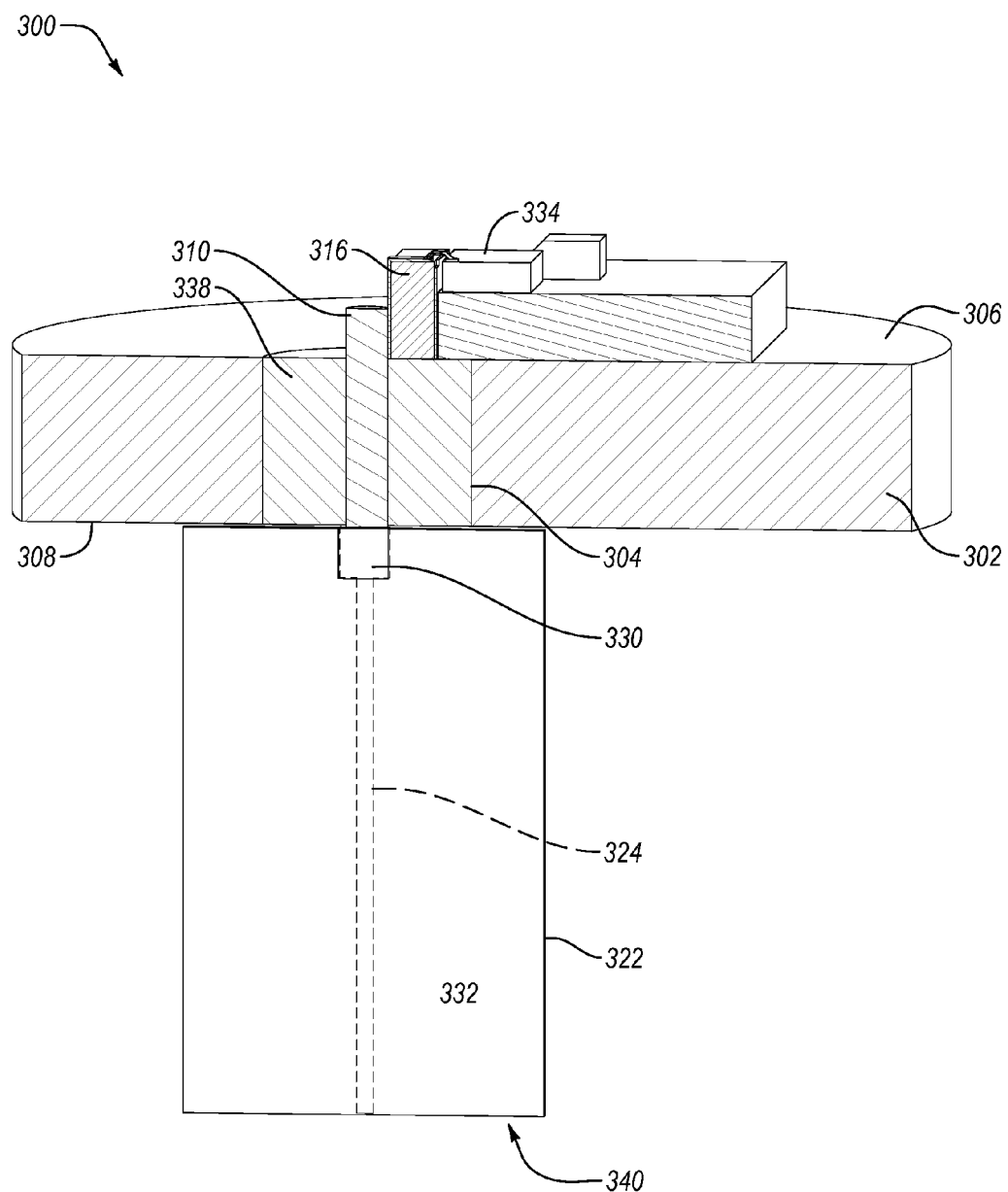
FIGS. 3A-3C illustrate an example radio frequency system ("RF system") that may be implemented in the OSA of FIGS. 2A and 2B.
Figure 3B:
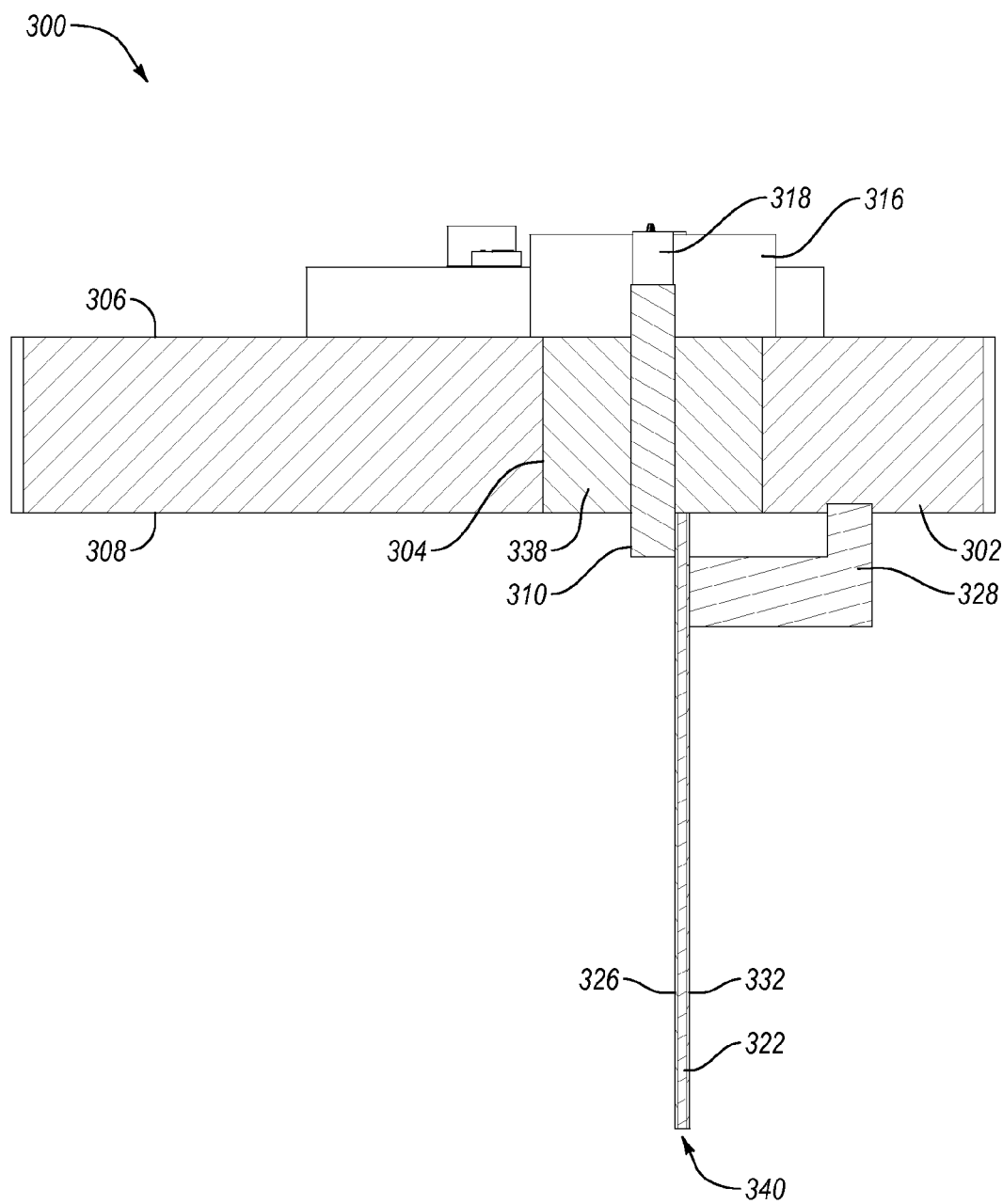
Figure 3C:
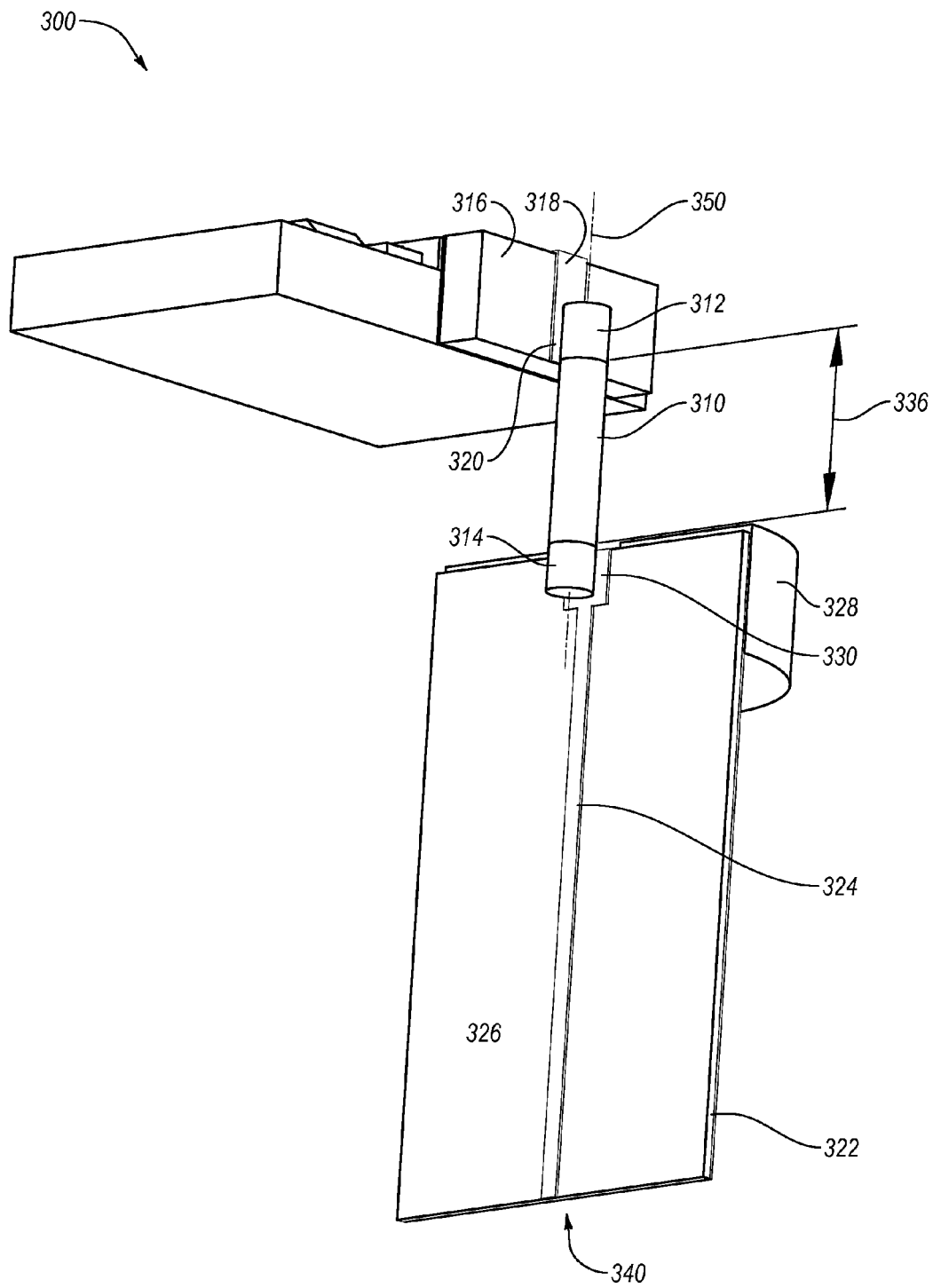

FIGS. 3A-3C illustrate an example radio frequency system ("RF system") 300 that may be implemented in the OSA 200 of FIGS. 2A and 2B. Specifically, FIG. 3A illustrates a first perspective cross-sectional view of the RF system 300; FIG. 3B illustrates a side cross-sectional view of the RF system 300; and FIG. 3C illustrates a second perspective view of the RF system 300 with a header omitted. The RF system 300 may generally correspond to, for example, the components of FIGS. 2A-2B discussed above excluding the barrel 204 and the TO can housing 214.

The RF system 300 may be configured to communicate electrical currents that oscillate at the multi-megahertz range designated as a radio frequency range ("RF range"). Electrical currents that oscillate at the RF range may be referred to as radio frequency signals ("RF signals"). RF signals may be communicated between an active component 334 (FIG. 3A only) and a PCB (not shown) of a transceiver module or a host system via an RF pin 310. For example with combined reference to FIGS. 1B and 3A, RF signals may be communicated between the active component 334 and the PCB 124 of the transceiver 100.

Additionally or alternatively, the RF system 300 may be configured to communicate differential signals between the active component 334 and the PCB 124 of the transceiver 100. In these and other embodiments of the RF system 300, the RF system 300 may include two or more RF pins 310.

With reference to FIGS. 3A and 3B, the RF system 300 may include a header 302 having an interior header surface 306 and an exterior header surface 308. The interior header surface 306 is referred to as "interior" and the exterior header surface 308 is referred to as "exterior" because in embodiments in which the header 302 is assembled with a TO can housing, the interior header surface 306 may be located in an internal volume defined by the TO can housing and the header 302. For example, with combined reference to the FIGS. 2B, 3A, and 3B, the interior header surface 306/218 may be located in the internal volume 220 when the header 302/216 is assembled with the TO can housing 214. Conversely, the exterior header surface 308/222 are not in the internal volume 220 when the header 302/216 is assembled with the TO can housing 214.

Referring back to FIGS. 3A and 3B, the header 302 may define a radio frequency pin opening ("RF pin opening") 304. The RF pin opening 304 may be cylindrical with a constant circular cross-section extending from the interior header surface 306 to the exterior header surface 308. The RF opening 304 enables the RF pin 310 to penetrate the header 302.

Referring to FIGS. 3A-3C, the RF system 300 may include an RF insulating eyelet 338 that fits within the RF pin opening 304 and accepts the RF pin 310. The RF insulating eyelet 338 may surround the portion of the RF pin 310. For example, the RF insulating eyelet 338 may surround a portion of the RF pin 310 along a length of the RF pin 310 about equal to a width of the header 310. The portion of the RF pin 310 surrounded by the RF insulating eyelet 338 may be referred to as a penetration length 336 (FIG. 3C only) of the RF pin 310.

Generally, the RF insulating eyelet 338 may be configured to insulate the RF pin 310 from the header 302 and/or secure the RF pin 310 in relation to the header 302. For example, the RF insulating eyelet 338 may be composed of glass, plastic, and/or some combination of these and/or other insulator materials. Thus, the RF insulating eyelet 338 may secure the RF pin 310 to the header 302 while prohibiting the transfer of RF signals between the header 302 and the RF pin 310.

The RF pin 310 may be sized to include the penetration length 336 along with a first surface connection 312 (FIG. 3C only) and a second surface connection 314 (FIG. 3C only). The length of the RF pin 310 may be such that when the RF pin is inserted through the RF pin opening 304, the first surface connection 312 extends past the interior header surface 306 and the second surface connection 314 extends past the exterior header surface 308. With combined reference to FIGS. 2B-3C, when the RF pin 310 is sized this way, the first surface connection 312 may be located in the internal volume 220 and the second surface connection 314 may be located outside of the internal volume 220. Accordingly, the first surface connection 312 may be couple to an interior connector and the second surface connection 314 may be electrically coupled to an exterior connector.

As previously described with respect to FIG. 2B, the DC pin 230 and/or the ground pin 234 may include the flange 252 that may secure the DC pin 230 and/or the ground pin 234 to the flex circuit 236. With combined reference to FIGS. 2B and 3C, however, the RF pin 310/232 may be physically configured to reduce physical interference when making electrical connections between the first surface connection 312 and the interior connector and between the second surface connection 314 and the exterior connector. For example, the RF pin 310/232 may omit a flange, may include a flush and/or smooth region adjacent to the second surface connection 314 and/or the first surface connection 312, the RF pin 310/232 may include a consistent cross sectional shape along the length of the RF pin 310/232 or some combination thereof. The cross sectional shape may include a circular or a rectangular cross section, for instance.

Referring back to FIGS. 3A-3C, the interior connector may include, for example, a submount 316 that includes a submount trace 318 (FIGS. 3B-3C only). In some embodiments, the submount 316 may be mounted or otherwise affixed to the interior header surface 306. The submount trace 318 may include a pin connection portion 320 (FIG. 3C only). The pin connection portion 320 may be oriented such that the pin connection portion 320 is in-line or collinear with the RF pin 310. For example, the RF pin 310 may be oriented along a central axis 350 (FIG. 3C only). To be in-line or collinear, the pin connection portion 320 may be oriented along the central axis 350, parallel to the RF pin 310. The pin connection portion 320 may be electrically coupled to the first surface connection 312 through soldering or another electrical coupling method.

Additionally, the submount trace 318 may be electrically coupled to the active component 334, for example. Thus, the RF signals communicated through the RF pin 310 may be communicated to the active component 334. For example in some embodiments, the active component may be a laser diode and the RF signal may be a laser-driving signal that activates the laser diode.

In this and other embodiments, the submount trace 318 includes a linear strip. However, the illustrated configuration of FIGS. 3A-3C is not meant to be limiting. The submount trace 318 may be curve, zigzagged, or may be otherwise non-linear, without limitation. However, the pin connection portion 320 may be in-line with the RF pin 310 such that the first connection surface 312 may make an in-line connection with the pin connection portion 320. In alternative embodiments, the interior connector may be located on a component or structure other than the submount 316. For example, the interior connector may be an electrical trace formed on another structure, or a conductive area of the header 302, for instance.

The exterior connector may include any exterior electrical trace. For example, the exterior connector may include a flex circuit 322 that includes a flex trace 324 which may further include a flex trace connection 330 (FIGS. 3A and 3C only). The flex circuit 322 may be electrically coupled to the RF pin 310 at the flex trace connection 330 and to a PCB at a second end 340 of the flex circuit 322. For example, with combined reference to FIGS. 1B and 3A-3C, the flex circuit 322 may be electrically coupled to the PCB 124 via PCB connectors 130 at the second end 340.

Referring back to FIGS. 3A-3C, the flex circuit 322 is shown without being bent or otherwise changed to illustrate the orientation of the flex circuit 322 when the RF pin 310 is electrically coupled to the flex trace connection 330. The flex trace 324 and the flex trace connection 330 may be located on a first flex circuit surface 326 (FIGS. 3B and 3C only). The flex circuit 322 may be oriented such that first flex circuit surface 326 abuts the second electrical connection 314 of the RF pin 310 and the flex circuit 322 may further be oriented such that the flex trace 324 or at least the flex trace connection 330 is oriented in-line or collinear with the RF pin 310. That is, the RF pin 310 may be oriented about the central axis 350. To be in-line or collinear with the RF pin 310 the flex trace connection 330 may be oriented along the central axis 350, parallel to the RF pin 310. The flex trace connection 330 may be electrically coupled to the second surface connection 314.

In sum, the embodiments in FIGS. 3A-3C represent a concept that some portion of the exterior electrical trace and the RF pin 310 may be collinear and/or some portion of the interior electrical trace and the RF pin 310 may be collinear.

For example, in the embodiments illustrated in FIGS. 3A-3C, some portion of the flex trace 324 and the RF pin 310 may be arranged in a collinear configuration with respect to each other. Additionally, some portion of the submount trace 318 and the RF pin 310 may be arranged in a collinear configuration with respect to each other. The portion of the flex trace 324 arranged collinearly to the RF pin 310 includes the flex trace connection 330 which may be configured to be electrically coupled to the second surface connection 312 of the RF pin 310. Likewise, the portion of the submount trace 318 arranged collinearly to the RF pin includes the pin connection portion 320 which may be configured to be electrically coupled to the first surface connection 312 of the RF pin 310.

The flex circuit 322 includes a second flex circuit surface 332 (FIGS. 3A and 3B only) that may abut a support block 328 (best illustrated in FIG. 3B). The support block 328 may support the flex trace connection 330 during the formation of the electrical coupling between the second surface connection 314 and the flex trace connection 330. Additionally or alternatively, the support block 328 may support some additional portion of the flex circuit 322. In this and other embodiments, the support block 328 may be generally hemispherical in shape and/or may be affixed to the header 302. However, the illustrated embodiment is not meant to be limiting, the support bock 328 and the header 302 may be integrated in a single component.

One result of the in-line or collinear electrical coupling may include an increase in the bandwidth of a TO can implementing embodiments described herein. For example, the bandwidth may increase from about 20 GHz to about 40 GHz. This may allow the use of TO cans implementing embodiments described herein in multiple OSAs for little expense.

The embodiments described herein discuss in-line or collinear connections for a single RF pin 310. However, in alternative embodiments, in-line or collinear connection may be made for DC pins, ground pins, multiple RF pins or some combination thereof. For example, a TO can may include a second RF pin that extends through a header such that a first surface connection of the second RF pin is located in an internal volume of the TO can and a second surface connection of the second RF pin is located outside the TO can. The second RF pin my include in-line or collinear connections.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transistor outline ("TO") can comprising:
a header having an interior header surface and an exterior header surface;
a radio frequency ("RF") pin opening defined by the header;
an internal volume defined by a TO can housing and the interior header surface;
an RF pin that extends through the RF pin opening such that a first surface connection of the RF pin is located in the internal volume and a second surface connection of the RF pin is located outside of the internal volume and extending past the exterior header surface;
a submount located in the internal volume, the submount including a submount trace, the submount trace including a pin connection portion in-line with the RF pin and electrically coupled to the first surface connection; and
a flex circuit including a flex trace, the flex trace including a flex trace connection in-line with the RF pin and electrically coupled to the second surface connection.

2. The TO can of claim 1, further comprising a support block protruding from the exterior header surface, wherein the flex circuit includes:
a first flex circuit surface on which the flex trace is located,
a second flex circuit surface that abuts the support block.

3. The TO can of claim 2, wherein the support bock and the header are a single integrated component.

4. The TO can of claim 1, wherein the flex circuit is bent such that it defines:
a first flex portion that includes the flex trace connection and is substantially parallel to the RF pin, and
a second flex portion substantially perpendicular to the RF pin.

5. The TO can of claim 4, further comprising:
a direct current ("DC") pin that extends through a DC pin opening defined by the header, wherein the DC pin is electrically coupled to the second flex portion.

6. The TO can of claim 5, wherein the flex circuit defines a DC connection hole, wherein the DC pin extends through the DC connection hole and is coupled to the flex circuit at the DC connection hole.

7. The TO can of claim 1, further comprising:
an active component located in the internal volume, wherein the active component is electrically coupled to the submount trace.

8. The TO can of claim 7, wherein the active component is a laser diode.

9. The TO can of claim 8, wherein the laser diode is configured to operate at about 40 gigahertz.

10. An radio frequency ("RF") system configured to communicate RF signals between an active component of a transistor outline ("TO") can and a printed circuit board ("PCB"), the RF system comprising:
an exterior electrical trace configured to be electrically coupled to a PCB and including an exterior connector;
an interior electrical trace configured to be electrically coupled to the active component and including an interior connector; and
an RF pin including:
a first surface connection electrically coupled to the interior connector,
a second surface connection electrically coupled to the exterior connector, and
a penetration length between the first surface connection and the second surface connection that extends from an exterior of the TO can to an interior of the TO can,
wherein some portion of the exterior electrical trace and the RF pin are collinear, and
some portion of the interior electrical trace and the RF in are collinear.

11. The RF system of claim 10, further comprising an RF insulating eyelet that surrounds the penetration length, the RF insulating eyelet configured to insulate the RF pin from the TO can.

12. The RF system of claim 10, further comprising a flex circuit that includes the exterior electrical trace.

13. The RF system of claim 12, further comprising a submount that includes the interior electrical trace.

14. The RF system of claim 13, wherein the interior electrical trace is curved or otherwise non-linear in the portion other than the portion that is collinear to the RF pin.

15. The TO can of claim 10, wherein the RF pin includes a smooth region adjacent to the second surface connection and the first surface connection.

16. The TO can of claim 10, wherein the RF pin includes a consistent cross sectional shape along the length of the RF pin.

17. An optical subassembly ("OSA") comprising:
a barrel defining a transistor outline ("TO") cavity and a port, wherein the TO cavity is sized to receive a TO can and the port is configured to receive an optical fiber;
the TO can including:
a header having an interior header surface and an exterior header surface,
an RF pin that extends through the header such that a first surface connection of the RF pin is located in an internal volume of the TO can and a second surface connection of the RF pin is located outside the TO can,
a submount trace including a pin connection portion in-line with the RF pin and electrically coupled to the first surface connection, and
an active component electrically coupled to the submount trace; and
a flex circuit including a flex trace, the flex trace including a flex trace connection in-line with the RF pin, the flex trace connection being electrically coupled to the second surface connection.

18. The OSA of claim 17, wherein the TO can further comprises a second RF pin that includes an in-line connection, and
the RF pin and the second RF pin are collectively configured to communicate differential signals.

19. The OSA of claim 18, wherein the active component comprises an optical transmitter configured to operate at about 40 gigahertz.

20. An optical transceiver comprising the OSA of claim 19.

* * * * *

UNITED STATES PATENT AND TRADEMARK OFFICE
CERTIFICATE OF CORRECTION

| | | |
|---|---|---|
| PATENT NO. | : 8,854,836 B2 | Page 1 of 1 |
| APPLICATION NO. | : 13/452753 | |
| DATED | : October 7, 2014 | |
| INVENTOR(S) | : Deng et al. | |

It is certified that error appears in the above-identified patent and that said Letters Patent is hereby corrected as shown below:

In the Specification

Column 2, Line 19, delete "The a" and insert -- The --, therefor.

Column 5, Line 50, delete "barrel 202" and insert -- barrel 204 --, therefor.

Column 8, Lines 23-24, delete "second flex portion 240" and insert -- second flex portion 242 --, therefor.

Column 8, Line 27, delete "second flex portion 240." and insert -- second flex portion 242. --, therefor.

Column 9, Line 28, delete "header 310." and insert -- header 302. --, therefor.

Column 11, Line 9, delete "second surface connection 312" and insert -- second surface connection 314 --, therefor.

In the Claims

Column 12, Line 7, in Claim 2, delete "located," and insert -- located, and --, therefor.

Column 12, Line 9, in Claim 3, delete "bock" and insert -- block --, therefor.

Column 12, Line 52, in Claim 10, delete "RF in" and insert -- RF pin --, therefor.

Column 12, Line 65, in Claim 15, delete "TO can" and insert -- RF system --, therefor.

Column 13, Line 1, in Claim 16, delete "TO can" and insert -- RF system --, therefor.

Signed and Sealed this
Third Day of March, 2015

Michelle K. Lee
*Deputy Director of the United States Patent and Trademark Office*